(12) United States Patent
O'Berry

(10) Patent No.: US 6,182,415 B1
(45) Date of Patent: Feb. 6, 2001

(54) METHOD AND DEVICE FOR LOCATING A JOIST

(75) Inventor: Patrick Brian O'Berry, Lindenhurst, IL (US)

(73) Assignee: O'Berry Enterprises, Inc., Crystal Lake, IL (US)

(*) Notice: Under 35 U.S.C. 154(b), the term of this patent shall be extended for 0 days.

(21) Appl. No.: 09/344,478

(22) Filed: Jun. 25, 1999

(51) Int. Cl.[7] .................................................... E04F 15/00
(52) U.S. Cl. ............................ 52/741.1; 52/410; 52/514
(58) Field of Search ............................. 52/514, 741.1, 52/410

(56) References Cited

U.S. PATENT DOCUMENTS

| 3,977,142 | 8/1976 | Dove et al. . |
| 4,453,361 | 6/1984 | Hulsey . |
| 4,463,753 | 8/1984 | Gustilo . |
| 4,572,720 | 2/1986 | Rockenfeller et al. . |
| 4,713,886 | * 12/1987 | Ikeda ..................................... 30/366 |
| 5,118,235 | * 6/1992 | Dill ................................... 52/410 X |
| 5,295,774 | 3/1994 | Roberts . |
| 5,371,992 | 12/1994 | O'Berry . |

* cited by examiner

Primary Examiner—Christopher T. Kent
(74) Attorney, Agent, or Firm—Mathew R. P. Perrone, Jr.

(57) ABSTRACT

A joist locating device includes a screw having a head at one end, and a threaded portion at and adjacent to an opposing end, which is oppositely disposed from the head, with a long smooth barrel between the head and the threaded portion. A washer may fit over the barrel and threaded portion, but not the head in order to provide for the screw to be pulled from the floor.

5 Claims, 1 Drawing Sheet

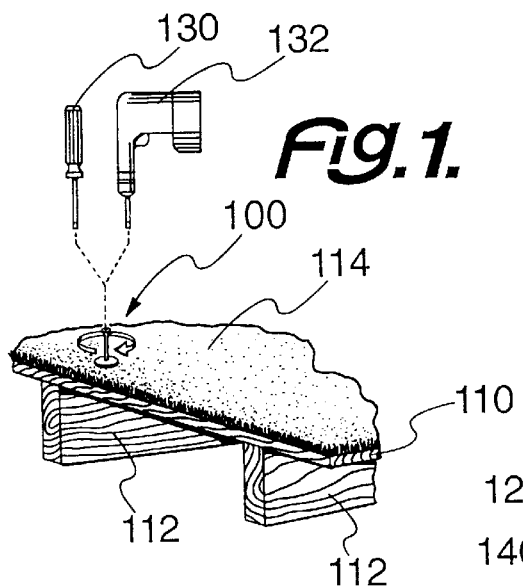
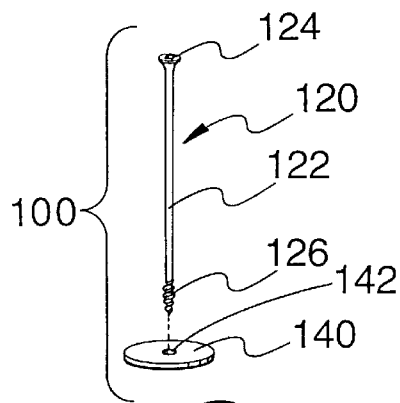
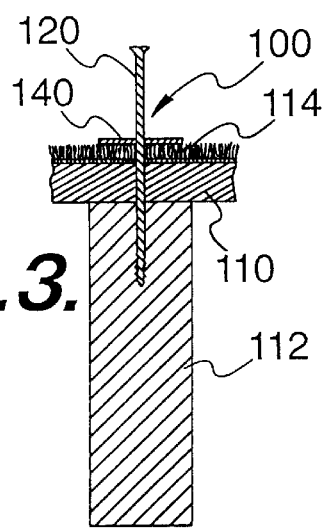
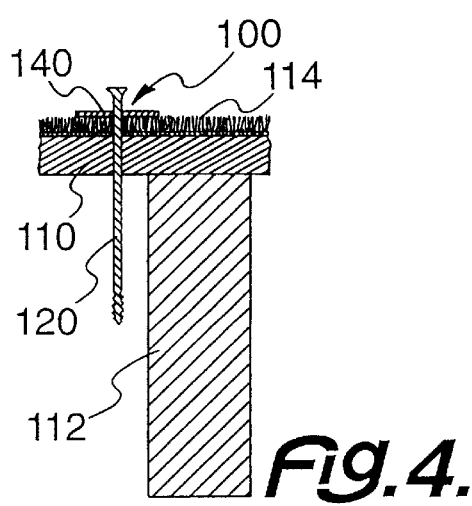
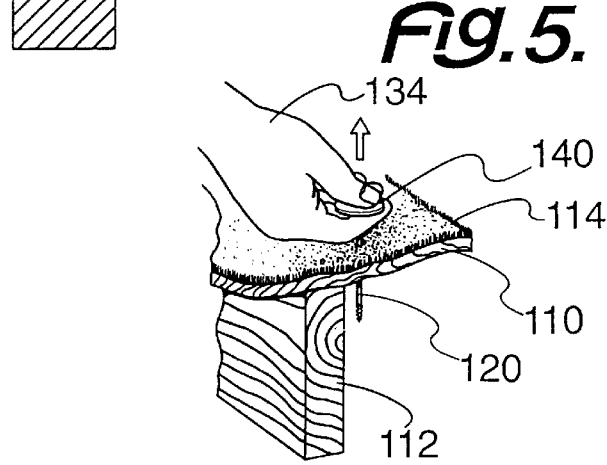

METHOD AND DEVICE FOR LOCATING A JOIST

This invention relates to a joist finding device and, more particularly to a joist finding device capable of locating a joist situated beneath a carpeted floor and a method for locating a joist.

BACKGROUND OF THE INVENTION

Squeaky floors can be an annoyance or even a dangerous structural defect. The squeak occurs due to an imperfect relation between a solid flooring material and the joists supporting the flooring material. Such squeaky floors are clearly discussed in U.S. Pat. No. 5,372,466 to Jon L. O'Berry, fully incorporated herein by reference. One of the key factors, in solving a squeaky floor problem by eliminating or minimizing the squeak, is locating the joist, which supports the floor at the point where the squeak is occurring.

In a carpeted room, it is difficult to use a standard device to locate a joist. One standard device is magnetic detector. Another is a sound echo check. Neither of these devices is efficient, especially in a carpeted room.

For example, the magnetic detectors for the nails in the joist cannot be used in view when carpeting is on the floor. The carpeting insulates the nails from a magnetic detection device. Yet, it is still desired to locate the joist as efficiently as possible. With the joist being located as efficiently as possible, the squeak in the floor can be eliminated as efficiently as possible.

Sound echo location is also prevented by the carpeting on the joist. It is difficult, if not impossible, to develop any reasonable sound distinction of a nail or a joist through the carpet on a carpeted floor, and thereby locate a joist.

It is undesirable to have the device for locating the joist be expensive or complicated to use. It is desired to achieve these results with a very simple uncomplicated device. Such actions on the part of the device can permit the squeaks to be acted on in an efficient manner. Such efficiency provides for the more effective use of an invention as described in the above cited patent.

Also, any joist locating procedure must occur with minimal or no damage to the surface. This is difficult to accomplish, when neither echo or sound detection, nor magnetic detection works well.

SUMMARY OF THE INVENTION

Among the many objectives of this invention is the provision of a device to locate a joist.

A further objective of this invention is to provide a screw to locate a joist, which may be easily removed.

A still further objective of this invention is to provide a screw to locate a joist, which causes minimal damage to the floor, resting on the joist.

Yet a further objective of this invention is to provide a method of locating a joist for a carpeted floor, which is superior to a magnetic location method.

Also an objective of this invention is to provide a method of locating a joist for a carpeted floor, which is superior to a sound location method.

A further objective of this invention is to provide a device to locate a joist, which may be easily removed.

A still further objective of this invention is to provide a device to locate a joist, which causes minimal damage to the floor, resting on the joist.

Yet a further objective of this invention is to provide a device to locate a joist for a carpeted floor, which is superior to a magnetic location method.

These and other objectives of the invention (which other objectives become clear by consideration of the specification, claims and drawings as a whole) are met by providing a screw having a head at one end, and a threaded portion at and adjacent to an opposing end, which is oppositely disposed from the head, with a long smooth barrel between the head and the threaded portion. A washer may fit over the barrel and threaded portion, but not the head in order to provide for the screw to be pulled from the floor, to complete the device.

BRIEF DESCRIPTION OF THE DRAWINGS

FIG. 1 depicts a perspective view of a joist locating device 100 in use on a floor 110.

FIG. 2 depicts an exploded perspective view of a joist locating device 100.

FIG. 3 depicts a side view of a screw 120 for use as part of joist locating device 100.

FIG. 4 depicts a side, cross-sectioned view of a screw 120 locating a joist 112.

FIG. 5 depicts a side, cross-sectioned view of a screw 120 missing a joist 112.

Throughout the figures of the drawings, where the same part appears in more than one figure of the drawings, the same number is applied thereto.

DESCRIPTION OF THE PREFERRED EMBODIMENTS

The joist finding device includes a threaded screw with a long plain or smooth barrel. There is a head at one end of the screw. Over the head of the screw is slidably mounted a pulling device. This pulling device is generally a washer having a small aperture centrally located therein.

With the threads at the base of the screw, and not on the tube, the screw can be driven through the carpeting and into the floor. As the screw driver is reversed to remove the screw, if a joist has been struck, the screw will move right out of the floor. Possibly only a minor pull will be required to complete the removal.

If a joist has not been struck, the screw will just spin in place, when the driver is reversed. At that point, the screw may be pulled with a screw puller without damaging the carpeting through which the screw has passed. The pulling out of the screw will be a major pull, requiring much more effort. Thus, great advantages are obtained with this particular device.

Alternatively, if the screw is pulled by the washer, the screw will either come right out or not move. The come right out situation or ease of removal means threads missed the joist. The not move condition of the screw indicates a joist struck. Reversal of the driver is then required to remove the screw. Either way the joist can be located with minimal floor damage.

A further advantage of a smooth, unthreaded tube is reduced damage to the carpet. The smooth tube is less likely to snag or otherwise damage the carpet. Such a structure makes the joist locating device extremely efficient.

In a preferred form, the barrel has a length up to about six times the length of the threads. More preferably, the barrel has a length about two times to about six times the length of the threads. Most preferably, the barrel has a length about two times to about five times the length of the threads.

While the threads may of any suitable type, most preferred are the self driving or self cutting threads, which do not require a predrilled hole. This saves time and damage to the surface being tested. It also cuts down the testing steps.

Referring now to FIG. 1, FIG. 2 and FIG. 3 collectively, the joist finding device 100 includes a threaded screw 120, which cooperates with a washer 140. The threaded screw 120 penetrates floor 110 and locates the joist 112. Washer 140 assists with the removal of screw 120, if joist 112 is missed.

Screw 120 has a long plain or smooth barrel 122. There is a head 124 at one end of barrel 122 of the screw 120. Oppositely disposed from head 124 and at the other end of barrel 122 are threads 126.

Adding FIG. 4 to the consideration, with the threads 126 at the base end of the screw 120, and not on the barrel 122, the screw 120 can be driven through the carpeting 114 and into the floor 110. As the hand screw driver 130 or the power screw driver 132 is reversed to remove the screw 120, if a joist 112 has been struck, the screw 120 will move right out of the floor 110.

Varying the situation to FIG. 5, if the joist 112 has not been struck, over the head 124 and on the barrel 122 of screw 120 is slidably mounted a pulling washer 140. This washer 140 has a small aperture 142 centrally located therein. Washer aperture 142 is smaller than head 124 in diameter, but larger than barrel 122 and threads 126. With washer 140, the screw 120 may be pulled with a screw puller without damaging the carpeting 114 if a joist 112 was not contacted.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. In a method for stopping a squeak in a floor by locating a support joist for the floor and securing the floor thereto, the improvement comprising:

(a) providing a screw having a head at a first end thereof, a threaded portion at a second end thereof and a substantially smooth barrel therebetween;

(b) mounting a pulling means over the screw;

(c) selecting a point on the floor;

(d) driving the screw through the point; and (e) testing the screw in order to determine if a joist has been struck.

2. The method of claim 1 further comprising:

(a) the testing comprising pulling on the screw;

(b) a lack of movement of the screw indicating a joist struck; and (c) an ease of movement of the screw indicating a joist missed.

3. The method of claim 2 further comprising:

(b) the lack of movement of the screw requiring the driving step to be reversed; and (c) the ease of movement of the screw requiring the screw to be pulled out.

4. The method of claim 1 further comprising:

(a) the testing comprising reversing a driver for the screw;

(b) the reversing causing the screw to move backwards indicating a joist struck; and (c) the reversing causing the screw to spin in place and indicating a joist missed.

5. The method of claim 4 further comprising:

(b) backwards moving of the screw indicating a minor removal pull is required; and (c) spinning in place of the screw indicating a major removal pull is required.

* * * * *